US010118122B2

United States Patent
DiCenzo et al.

(10) Patent No.: US 10,118,122 B2
(45) Date of Patent: Nov. 6, 2018

(54) CO2 COLLECTION METHODS AND SYSTEMS

(75) Inventors: Anthony M. DiCenzo, Costa Mesa, CA (US); Joseph P. Bruschi, Trabuco Canyon, CA (US); James G. Parlett, Fountain Valley, CA (US); Douglas Anthony Galasso, Trabuco Canyon, CA (US); Tab Hunter Crooks, Dana Point, CA (US)

(73) Assignee: The Boeing Company, Chicago, IL (US)

( * ) Notice: Subject to any disclaimer, the term of this patent is extended or adjusted under 35 U.S.C. 154(b) by 41 days.

(21) Appl. No.: 13/220,261

(22) Filed: Aug. 29, 2011

(65) Prior Publication Data

US 2013/0047664 A1     Feb. 28, 2013

(51) Int. Cl.
*B01D 53/62* (2006.01)
*B01D 53/047* (2006.01)
*B01D 53/04* (2006.01)
*B01D 53/82* (2006.01)
*C01B 32/55* (2017.01)
*B01D 53/14* (2006.01)

(52) U.S. Cl.
CPC .......... *B01D 53/04* (2013.01); *B01D 53/0454* (2013.01); *B01D 53/0476* (2013.01); *B01D 53/62* (2013.01); *B01D 53/82* (2013.01); *C01B 32/55* (2017.08); *B01D 53/1462* (2013.01); *B01D 53/1475* (2013.01); *B01D 2253/108* (2013.01); *B01D 2256/22* (2013.01); *B01D 2257/80* (2013.01); *B01D 2259/402* (2013.01); *B01D 2259/414* (2013.01); *Y02C 10/08* (2013.01); *Y02P 20/152* (2015.11)

(58) Field of Classification Search
CPC ...... B01D 8/00; B01D 53/04; B01D 53/1462; B01D 53/1475; Y02C 10/08
USPC .... 62/89, 90, 92, 93, 94, 96, 100, 106, 626, 62/636, 640
See application file for complete search history.

(56) References Cited

U.S. PATENT DOCUMENTS

| 4,249,915 A | 2/1981 | Sircar et al. |
| 4,264,340 A * | 4/1981 | Sircar ............... B01D 53/0476 95/122 |
| 4,551,197 A * | 11/1985 | Guilmette et al. ............... 216/93 |
| 4,726,815 A | 2/1988 | Hashimoto et al. |

(Continued)

FOREIGN PATENT DOCUMENTS

| DE | 40 03 533 A1 | 8/1990 |
| GB | 2 171 927 A | 9/1986 |
| JP | 2002013696 | 1/2002 |

OTHER PUBLICATIONS

First Office Action for Chinese Application No. 201210310837.7, dated May 29, 2015, 15 pages.

(Continued)

*Primary Examiner* — John F Pettitt
(74) *Attorney, Agent, or Firm* — Walters & Wasylyna LLC

(57) ABSTRACT

Methods and systems of collecting carbon dioxide are disclosed. In one example, a method includes removing water from atmospheric air with a condenser and a desiccant material to produce dry air, adsorbing carbon dioxide to a material from the dry air, releasing the adsorbed carbon dioxide to a vacuum chamber, and transitioning the released carbon dioxide from a gas to a solid in the vacuum chamber.

12 Claims, 5 Drawing Sheets

(56) References Cited

U.S. PATENT DOCUMENTS

| | | | |
|---|---|---|---|
| 4,784,672 A * | 11/1988 | Sircar | 95/97 |
| 5,183,484 A | 2/1993 | Yamaguchi et al. | |
| 5,229,089 A * | 7/1993 | Ramachandran | B01D 53/0476 423/210 |
| 5,261,250 A * | 11/1993 | Missimer | 62/55.5 |
| 5,488,833 A * | 2/1996 | Stewart | 62/55.5 |
| 5,518,526 A * | 5/1996 | Baksh | B01D 53/0476 95/100 |
| 5,855,118 A * | 1/1999 | Lorimer | 62/55.5 |
| 5,935,297 A * | 8/1999 | Amlinger | B01D 53/0446 95/101 |
| 6,048,384 A * | 4/2000 | Smolarek | B01D 53/0476 95/101 |
| 6,070,431 A * | 6/2000 | Howard | C01B 31/20 62/620 |
| 6,314,957 B1 * | 11/2001 | Boissin et al. | 128/204.17 |
| 6,332,925 B1 * | 12/2001 | Noji et al. | 118/715 |
| 6,974,496 B2 * | 12/2005 | Wegeng et al. | 96/126 |
| 7,650,939 B2 | 1/2010 | Zubrin et al. | |
| 7,736,416 B2 * | 6/2010 | Nalette et al. | 95/1 |
| 2008/0000351 A1 * | 1/2008 | Celik et al. | 95/95 |
| 2008/0031801 A1 | 2/2008 | Lackner et al. | |
| 2008/0202339 A1 | 8/2008 | Nalette et al. | |
| 2010/0242724 A1 * | 9/2010 | Chen | B01D 53/0476 95/51 |
| 2010/0314136 A1 | 12/2010 | Zubrin et al. | |

OTHER PUBLICATIONS

European Examination Report, Application No. 12180636.8, dated Nov. 11, 2015, pp. 5.
Canadian Office Action, Application No. 2818111, dated Dec. 2, 2015, pp. 6.
Chinese Office Action, Application No. 2012103108377, dated Jan. 25, 2016, pp. 14.
Notice of Reasons for Rejection, Japanese Application No. 2012-187662, dated Apr. 12, 2016, pp. 2.
Extended European Search Report in Application No. 12180636.8 dated Dec. 14, 2012.

* cited by examiner

CO2 COLLECTION METHODS AND SYSTEMS

BACKGROUND

The field of the disclosure relates generally to carbon dioxide (CO2) collection, and more specifically to methods and systems for collecting CO2 from atmospheric air.

CO2 is collected for numerous purposes. Natural sources of CO2 are commonly mined to collect CO2 for various industrial purposes. CO2 is also collected as a byproduct of industrial processes and to remove excess CO2 from a supply of air.

A significant amount of CO2 is used in enhanced oil recovery (EOR). Today oil is being extracted from many oil wells that have been abandoned but still possess significant amounts of crude oil. Typically, an oil well only provides approximately 30% of its oil during the primary recovery phase. Another 20% may be recovered using secondary recovery techniques such as water flooding to raise the underground pressure. EOR provides a third (or tertiary) recovery technique that has been used to recover an additional 20% or more of the oil from the underground oil reservoirs. The EOR phase involves injecting very large amounts of gas into the ground and then recovering much of it along with the recovered oil. CO2 is a preferred gas due to its ability to mix with the crude oil and render the oil to be substantially less viscous and more readily extractable. Conducting these EOR operations requires a significant capital investment to access the remaining oil in the ground. However, the current declining production of oil reservoirs and rising oil prices makes EOR more affordable today creating a huge demand for CO2.

CO2 for use in industrial processes, such as EOR for example, is commonly collected from natural or anthropogenic sources and delivered to a location at which it will be used. The CO2 may be delivered via tanks, a pipeline, or other suitable methods of delivery. In many instances, the location of use is remote from the location of collection of the CO2, thereby increasing the cost to the user of the CO2.

BRIEF DESCRIPTION

According to one aspect of the present disclosure, a method of collecting carbon dioxide includes removing water from atmospheric air with a condenser and a desiccant material to produce dry air, adsorbing carbon dioxide to a material from the dry air, releasing the adsorbed carbon dioxide to a vacuum chamber, and transitioning the released carbon dioxide from a gas to a solid in the vacuum chamber.

In another aspect, an apparatus for collecting carbon dioxide includes a plurality of air moving devices configured to generate a flow of atmospheric air into the apparatus and a condenser for removing water from the flow of atmospheric air. The apparatus includes a desiccant for removing additional water from the flow of atmospheric air to produce substantially dry air, and a contactor chamber for adsorbing carbon dioxide from the dry air to a material in the contactor chamber. The apparatus includes a vacuum chamber for evacuating the adsorbed carbon dioxide from said contactor chamber and transitioning the evacuated carbon dioxide from a gas to a solid.

In yet another aspect, an apparatus for collecting carbon dioxide includes a plurality of air moving devices configured to generate a flow of atmospheric air into the apparatus. The apparatus includes a condenser for removing water from the flow of atmospheric air, a first collection assembly configured to extract carbon dioxide from a flow of air from the condenser, and a second collection assembly configured to extract carbon dioxide from a flow of air from said condenser. The apparatus includes a controller configured to direct a flow of air from the condenser alternately to the first collection assembly and the second collection assembly.

The features, functions, and advantages that have been discussed can be achieved independently in various embodiments or may be combined in yet other embodiments further details of which can be seen with reference to the following description and drawings.

DETAILED DESCRIPTION

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Methods and systems for collecting carbon dioxide (CO2) are described herein. Although the systems and methods are described for use with enhanced oil recovery (EOR) and in fixed location CO2 collection plants, aspects of this disclosure may be used in other areas and applications. Moreover, the methods and systems described herein may be scaled up or scaled down for use in various other areas an applications, including use in moveable, or portable, CO2 collection facilities. The embodiments described herein may provide increased CO2 production over some known methods of CO2 collection. Further, the described embodiments may provide for CO2 collection in environments having atmospheric air with a greater water content than the environments in which some known methods are capable of operating. Moreover, the described embodiments provide water as a byproduct of the collection of CO2 and remove more CO2 from the environment than is produced by the embodiments in the process of collecting the CO2.

Figure 1:
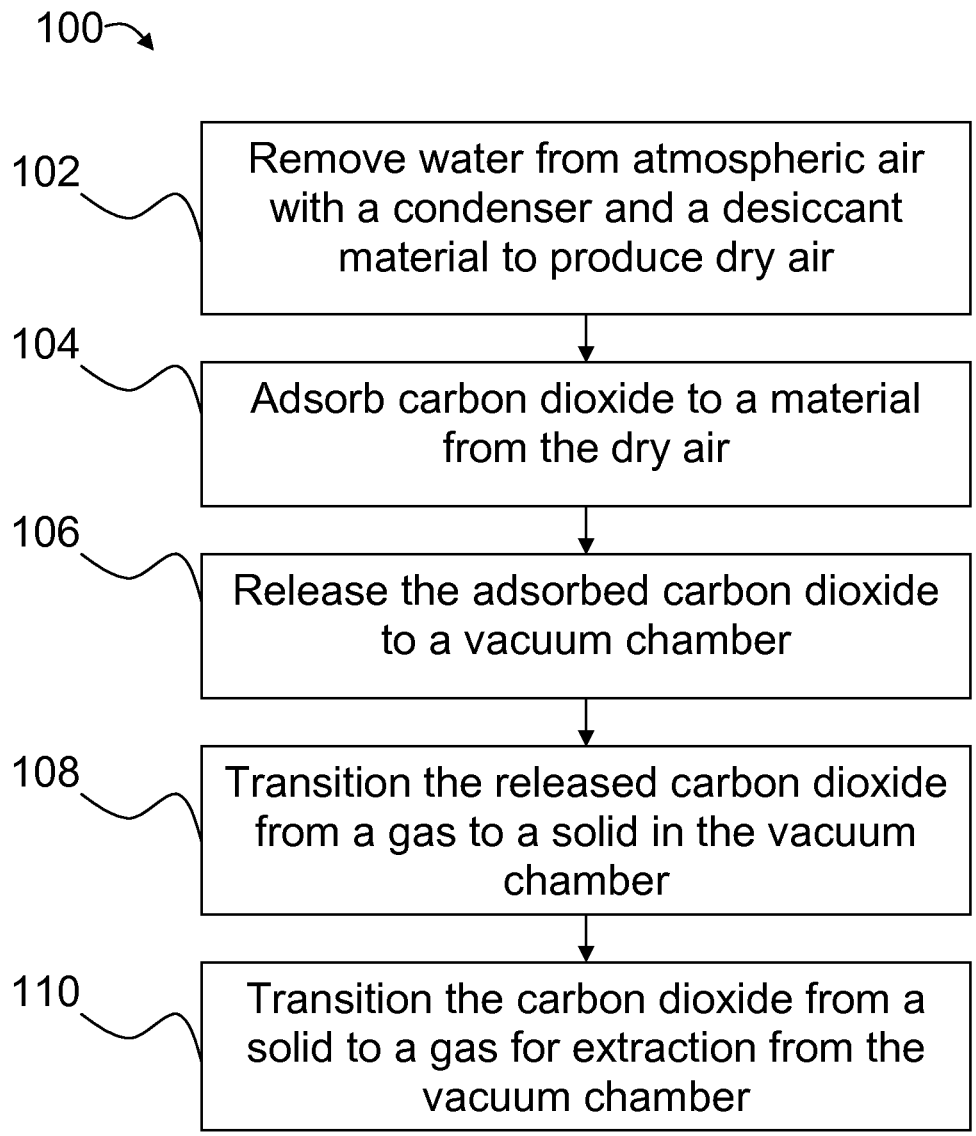
FIG. 1 is a flow diagram of an example method of collecting carbon dioxide.

Referring more particularly to the drawings, FIG. 1 is a flow diagram of an exemplary method, generally indicated by the reference numeral 100, of collecting CO2. Method 100 includes removing 102 water from atmospheric air with a condenser and a desiccant material to produce dry air. Carbon dioxide is adsorbed 104 to a material from the dry air, and the adsorbed carbon dioxide is released 106 to a vacuum chamber. Method 100 includes transitioning 108 the released carbon dioxide from a gas to a solid in the vacuum chamber and transitioning 110 the solid CO2 to a gas for extraction from the vacuum chamber.

Figure 2:
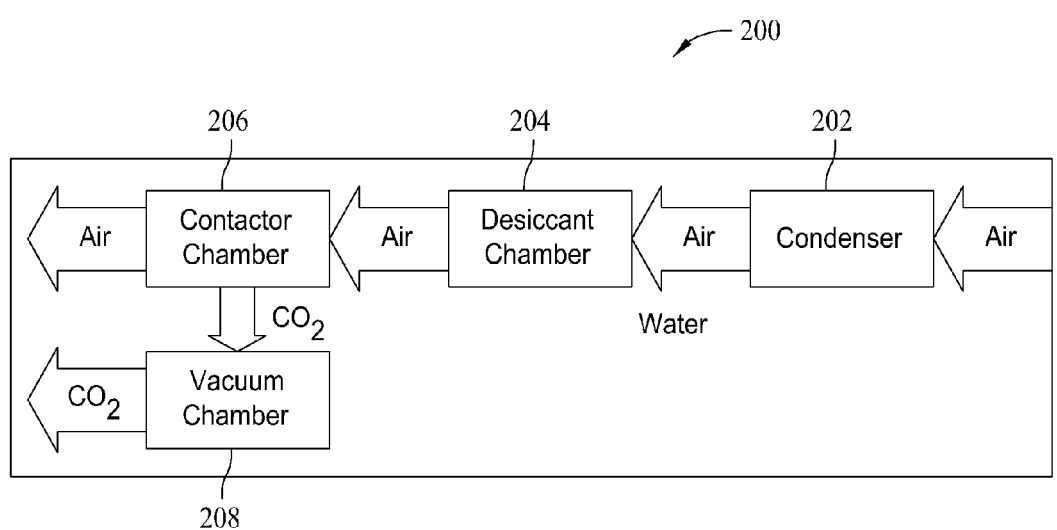
FIG. 2 is a block diagram of an example apparatus for collecting carbon dioxide according to the method shown in FIG. 1.

FIG. 2 is a block diagram of an exemplary apparatus 200 for collecting CO2, such as by the method 100 described above. Large amounts of free air are blown through a condenser 202 that removes most of the water from the air. The dryer air is then directed through a desiccant chamber 204 that contains a desiccant to remove substantially all of the remaining water in the air. The air next enters a contactor chamber 206 which includes a material that adsorbs CO2 from the dry air. When a sufficient amount of CO2 has been adsorbed to the material, the adsorbed CO2 is released to a vacuum chamber 208. The gaseous CO2 in vacuum chamber 208 is transitioned to a solid in vacuum chamber 208.

Condenser 202 and desiccant chamber 204 remove substantially all of the water contained in the air to produce dry air for use in the remainder of the process of collecting CO2. The water removed from the air is collected as a byproduct of the process. The collected water may then be used for any suitable purpose.

Desiccant chamber 204 contains a desiccant material to remove substantially all of the remaining water from the air that has passed through condenser 202. In the exemplary embodiment, the desiccant material is a molecular sieve material. In some embodiments, the desiccant material is a molecular sieve material with an alkali metal aluminosilicate structure that has an effective pore opening of three angstroms. In other embodiments, other desiccant material may be used including, for example, molecular sieve material having different structures and/or effective pore sizes. Any desiccant material suitable to remove substantially all of the water remaining in the air passed through condenser 202 may be used.

Contactor chamber 206 includes a material that adsorbs CO2 from the dry air. In the exemplary embodiment, the material is a molecular sieve material. In some embodiments, the molecular sieve material is a molecular sieve material with a 10 angstrom effective pore opening size. In some embodiments, the molecular sieve material is a zeolite material. In other embodiments, the material may be any material suitable for adsorbing CO2 from dry air.

In the exemplary embodiment, the adsorbed CO2 is released from the material in contactor chamber 206 by subjecting the material to vacuum. In some embodiments contactor chamber 206 is substantially sealed to the flow of air, and vacuum is applied, via vacuum chamber 208, to contactor chamber 206. The adsorbed CO2 releases from the material in contactor chamber 206 to vacuum chamber 208.

Within vacuum chamber 208, the gaseous CO2 is transitioned to a solid. In the exemplary embodiment, the CO2 is transitioned to a solid using a surface within vacuum chamber 208 cooled to a temperature low enough to cause the gaseous CO2 to solidify on the cold surface. In some embodiments, the vacuum chamber includes a cold finger through which a coolant is passed to reduce the temperature of the external surface of the cold finger, onto which the CO2 solidifies. In other embodiments, any other suitable technique may be used to solidify the released CO2.

The solid CO2 within vacuum chamber 208 may be collected by any suitable method of collection. In the exemplary embodiment, the solid CO2 is transitioned back to a gas and extracted for storage and/or transport. The solid CO2 is transitioned to a gas by raising the temperature within vacuum chamber 208 until the solid CO2 transitions to gaseous CO2. In other embodiments, any other suitable method for forcing the solid CO2 to transition to a gas may be utilized.

Figure 3:
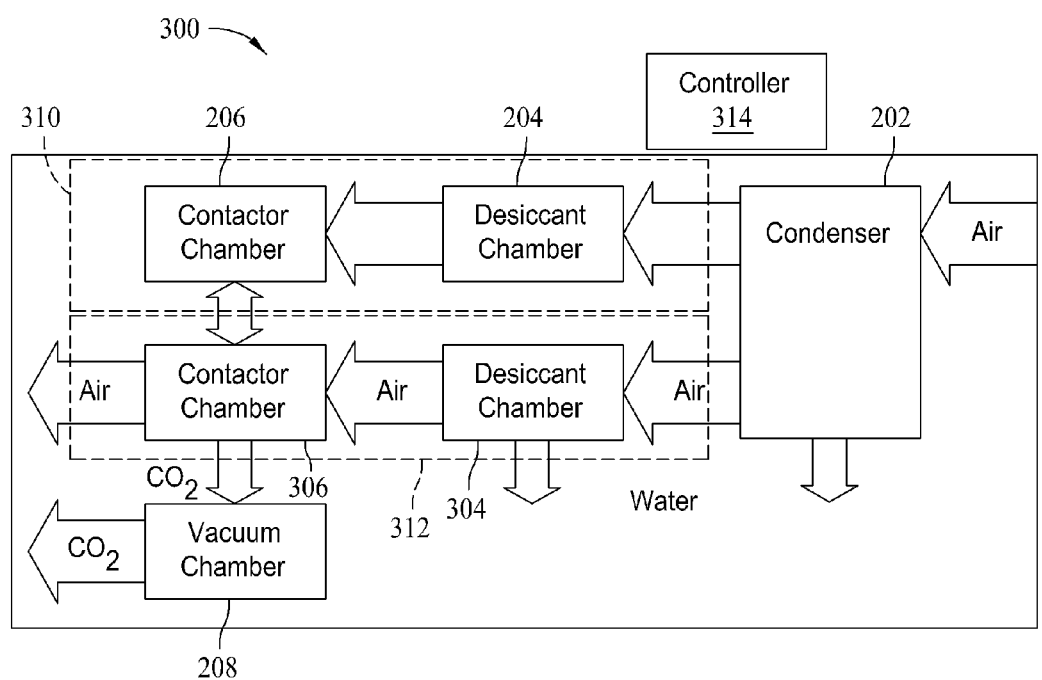
FIG. 3 is a block diagram of another example apparatus for collecting carbon dioxide according to the method shown in FIG. 1.

FIG. 3 is a block diagram of another exemplary apparatus 300 for collecting CO2 according to method 100. Apparatus 300 includes condenser 202, desiccant chamber 204, contact chamber 206 and vacuum chamber 208. Apparatus 300 also includes a desiccant chamber 304 and a contact chamber 306. Desiccant chamber 204 and contact chamber 206 form a first collection assembly 310, while desiccant chamber 304 and contact chamber 306 form a second collection assembly 312. Each of the first and second collection assemblies 310 and 312 may be used to extract carbon dioxide from a flow of air from condenser 202 in the manner described above. Each of the first and second collection assemblies 310 and 312 may also be described as a collection channel or path.

A controller 314 controls operation of the apparatus 300 and directs a flow of air from condenser 202 alternately to first collection assembly 310 and second collection assembly 312. For example, after operating first collection assembly 310 for a cycle substantially as discussed above with respect to apparatus 200, controller 314 may close off first collection assembly 310 and open second collection 312. Air from condenser 202 passes into desiccant chamber 304 and is dried as described above with respect to apparatus 200. The dry air then passes to contact chamber 306, where CO2 adsorbs to a material in contact chamber 306. While this is occurring, desiccant chamber 204 is regenerated to remove collected water (not shown in FIG. 3) from its last cycle.

When sufficient CO2 has adsorbed in contactor chamber 306, controller 314 seals contactor chamber 306 to the air flow from condenser 202, and connects contactor chambers 206 and 306 in fluid communication with each other. Contactor chamber 206 is at a lower pressure, because of its last cycle, than contactor chamber 306 and the pressures in contactor chambers 206 and 306 equalize. Controller 314 fluidically couples vacuum chamber 208 to contact chamber 306 and the pressure within contact chambers 206 and 306 is reduced to release the CO2 from the material in contact chamber 306.

When substantially all of the CO2 has been released from contactor chamber 306 to vacuum chamber 208, the connection between contactor chambers 206 and 306 is closed. Controller 314 may then direct the flow of air from condenser 202 to first collection assembly 310 to begin the extraction process with first collection assembly 310 while second collection assembly finishes the collection process and the desiccant in desiccant chamber 304 is regenerated. In vacuum chamber 208, gaseous CO2 is transitioned to a solid in the manner described above. When substantially all of the adsorbed CO2 has been extracted to vacuum chamber 208, the connection between contactor chamber 306 and vacuum chamber 208 is closed and controller 314 increases the temperature in vacuum chamber 208 to transition the solid CO2 to a gas. The CO2 gas is then extracted from vacuum chamber 208 to an external storage facility or pipeline (not shown).

Figure 4:
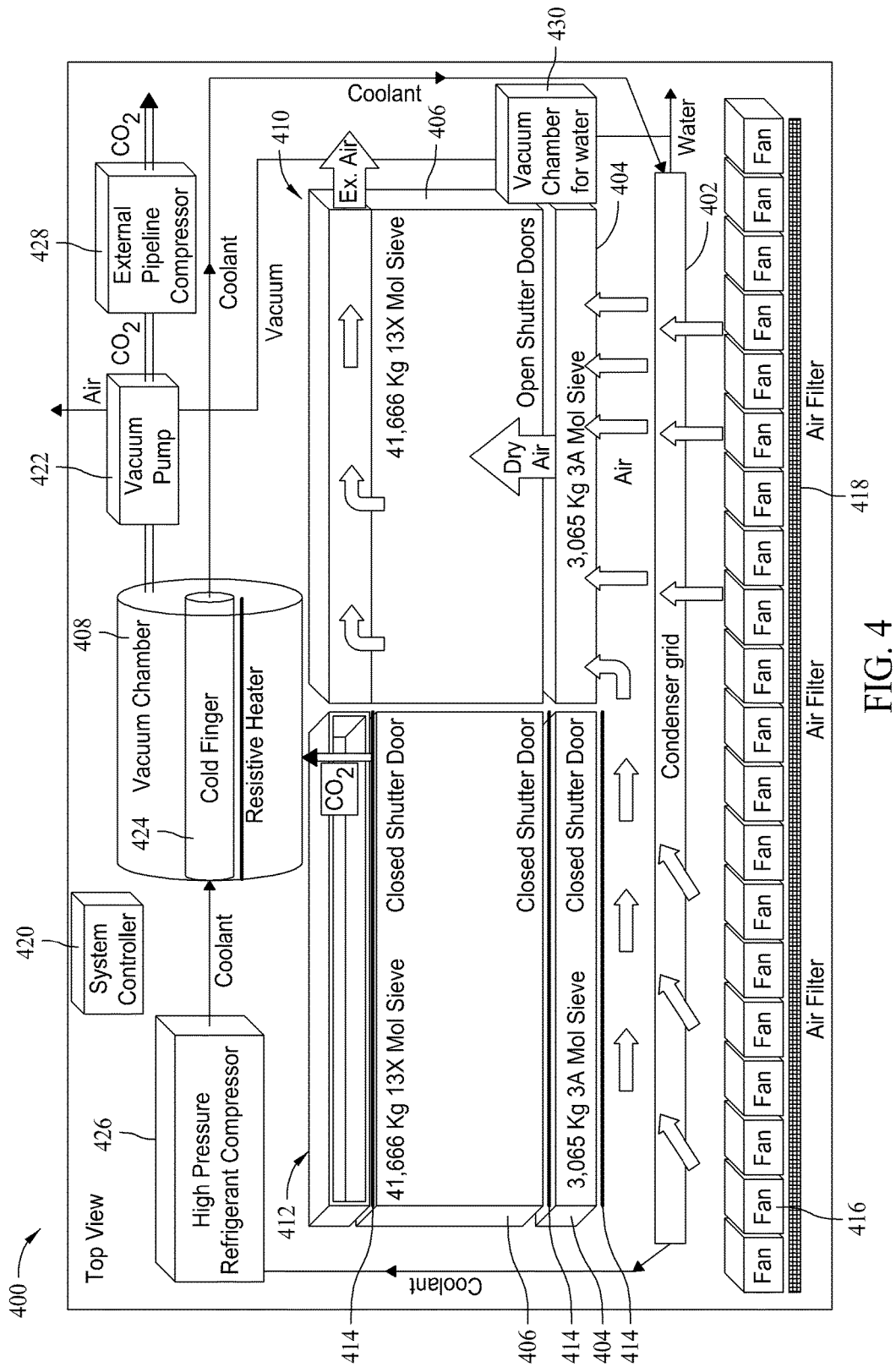
FIG. 4 is a diagram of another example apparatus for collecting carbon dioxide.
Figure 5:
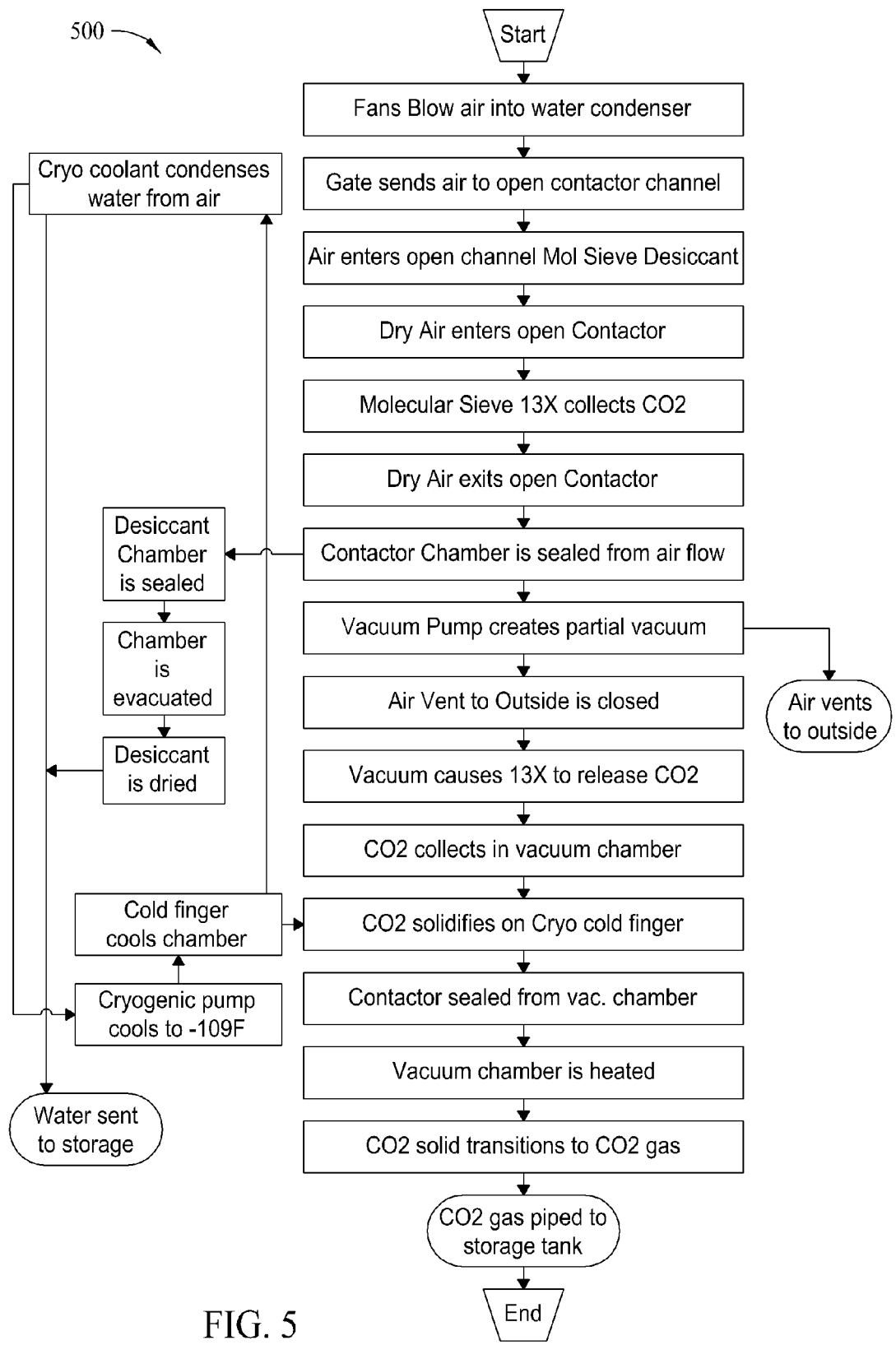
FIG. 5 is a flow diagram of a method of collecting carbon dioxide using the apparatus shown in FIG. 4.

FIG. 4 is a diagram of another example apparatus, or system, 400 for collecting carbon dioxide according to one or more aspects of this disclosure. FIG. 5 is a flow diagram 500 of operation of an apparatus for collecting carbon dioxide, such as apparatus 400.

Apparatus 400 includes a condenser grid 402, a first collection assembly 410, a second collection assembly 412, and a vacuum chamber 408. Each of first and second collection assemblies 410 includes a desiccant chamber 404 and a contactor chamber 406. Each of the first and second collection assemblies 410 and 412 may also be described as a collection channel or path. Each of first and second collection assemblies 410 and 412 includes a plurality of shutter doors 414 for substantially sealing desiccant chambers 404 and/or contactor chambers 406. A system controller 420 controls operation of apparatus 400. During operation, while one collection assembly 410 or 412 is collecting CO2 from free air, the other collection assembly 412 or 410 is regenerating by releasing the CO2 from contactor chamber 406 and by drying desiccant in desiccant chamber 406 to release its collected water.

Apparatus 400 includes a plurality of air moving devices 416 positioned to create a flow of atmospheric air through condenser grid 402. In the exemplary embodiment, the air moving devices 416 are fan assemblies. In some embodiments, air moving devices 416 are industrial grade direct-drive, double-wide, double-inlet fans with backward-inclined fan blades that pull air from outside apparatus 400. In the exemplary embodiment, apparatus 400 includes an air filter assembly 418. Air filter assembly 418 includes one or more filters positioned to filter external, atmospheric air pulled into apparatus 400 by air moving devices 416.

In the exemplary embodiment, condenser grid 402 includes a condenser or chiller dehydrator that reduces the water content in the air by using a laminar flow heat exchanger that contains cold nitrogen to lower the surface temperature of condenser grid 402 below the dew point. The water condenses from the free air on a heat exchanger and is collected as a secondary product. In some embodiments, condenser grid 402 reduces water content in the air by 90%.

Controller 420 diverts the output air from the condenser 402 into collection assemblies 410 and 412 on a cyclic basis of collection and regeneration. Desiccant chamber 404 in each collection assembly 410 and 412 removes substantially all of the remaining water in the air flowing from condenser 402. Water is captured by the desiccant in desiccant chamber 404 during the collection phase and is released during the regeneration phase of the operation cycle. Each desiccant chamber 404 can be independently and cyclically sealed for regeneration. Regeneration of desiccant chambers 404 utilizes residual vacuum and residual heat from other operations, such as vacuum pumps and cryogenic cooling pumps. In the exemplary embodiment, the desiccant material that captures the water is molecular sieve material. In some embodiments, the molecular sieve material has an alkali metal alumino-silicate structure with an effective pore opening of three angstroms.

Each contactor chamber 406 contains a material on which CO2 adsorbs from the dry air passing into contactor chamber 406 from desiccant chamber 404. In the exemplary embodiment, the material is a molecular sieve material. In some embodiments, the material includes a zeolite 13x molecular sieve material with a ten angstrom effective pore opening size. After CO2 has adsorbed to the material in contactor chamber 406, the CO2 regeneration phase begins. Contactor chamber 406 is substantially sealed from the flow of air from condenser 402 by closing shutter doors 414. A valve (not shown) connecting contactor chambers 406 of first and second collector assemblies 410 and 412 is opened to connect both contactor chambers 406. When one collector assembly 410 or 412 is in the collection phase of the cycle, the other collector assembly 412 or 410 is in, or has just completed, the regeneration phase of the cycle. The contactor chamber 406 of the collector assembly 410 or 412 that is in the regeneration phase is ready to begin its collection phase and is at a low pressure. When the two contactor chambers 406 are coupled by opening the valve connecting them, the pressure in both contactor chambers 406 equalizes. In some embodiments, the pressure equalizes to about one-half atmospheric pressure. A vacuum pump 422 extracts the chamber air from contactor chamber 406 via vacuum chamber 408 and vents the air outside apparatus 400. Vacuum pump 422 further reduces the pressure in contactor chamber 406 until the pressure is low enough for the adsorbent material to release the CO2 to vacuum chamber 408.

Vacuum chamber 408 extracts CO2 gas from contactor chamber 406 and captures the CO2 as a solid by using a cold-wall surface. In the exemplary embodiment, vacuum chamber includes a cold finger 424. A compressor 426 compresses a coolant that is passed through cold finger 424. In the exemplary embodiment, the coolant includes liquid nitrogen. The liquid nitrogen lowers the temperature of cold finger 424 to below minus 150 degrees Fahrenheit. After the coolant passes through cold finger 424, the coolant is routed through condenser 402 before returning to compressor 426. The surface of cold finger 424 is cooled to a temperature sufficient to cause the CO2 in vacuum chamber 408 to transition from a gaseous state to a solid state. The transition from gaseous CO2 to solid CO2 lowers the pressure in vacuum chamber 408 even more, which extracts even more CO2 from contactor chamber 406. When most of the CO2 has been evacuated from the contactor chamber 406 the valve between the two contactor chambers 406 is closed.

To extract the solid CO2 from vacuum chamber 408, vacuum chamber 408 is sealed from contactor chamber 406, the cooling of cold finger 424 is shut off, and heat is added to vacuum chamber 408 until the solid CO2 transitions to a gaseous state. In the exemplary embodiment, heat is added to vacuum chamber 408 using a resistive heater 428 within vacuum chamber 408. In other embodiments other heating devices capable of controlled heating of vacuum chamber 408 may be used. The transition from solid to gas increases the pressure in vacuum chamber 408. A valve (not shown) to an external compressor 428 is opened and the gaseous CO2 is extracted through external compressor 426 to an external storage facility or pipeline (neither shown).

Desiccant material in each desiccant chamber 404 is dried during regeneration of the contactor chamber 406 material. Desiccant chamber 404 is sealed, using shutters 414, after it is near saturation from the air that has come from condenser 402. A valve (not shown) between desiccant chamber 404 and a condenser chamber 430 is opened. Vacuum pump 422 pulls on condensing chamber 430, thereby pulling the water out of the desiccant material in desiccant chamber 404 and into condenser chamber 430. After the desiccant is dry, the valve closes and another valve (not shown) opens to drain the water from condenser chamber 430 and send it to the same storage as the water from condenser 402. As a result, water is collected from both condenser 402 and desiccant chamber 404.

System controller 420 monitors system operation parameters as well as environmental parameters, such as atmospheric temperature, pressure and humidity. System controller 420 uses this information to control the collection cycle time and the coolant flow through condenser 402. System controller 420 activates actuators to activate gates and valves to operate apparatus 400. In some embodiments, system controller 420 includes a built-in-test (BIT) routine that runs a detailed system operational test at start-up. In some embodiments, system controller 420 continuously monitors system operation and displays current status to a user on a display panel (not shown). In some embodiments, failures of apparatus 400 are alerted by system controller 420 with visual and audio alerts. In some embodiments, system controller 420 may automatically shut down the apparatus 400 partially or entirely upon occurrence of a failure.

In one example, apparatus 400 is implemented within a single story building having a footprint of about forty feet by fifty feet. In this example implementation, apparatus 400 includes twenty fans 416 producing a total air flow of about five million cubic feet per minute. This implementation collects over one hundred tons of CO2 per day. For every 100 tons of CO2 collected, this implementation removes about sixty to seventy tons of CO2 from the atmosphere after accounting for the CO2 created by the power plant powering apparatus 400.

In summary, and with reference to flow diagram 500 in FIG. 5, operation of one channel of an apparatus for collecting carbon dioxide, such as apparatus 400 begins with fans blowing air into a water condenser. Cryogenic coolant flows through the condenser to condense water from the air. A gate sends air to an open contactor channel and the air enters a mol sieve desiccant in the open channel. The air, which is now dry, enters an open contactor chamber where CO2 collected by a 13× molecular sieve. The dry air passes through the open contactor chamber. After sufficient carbon dioxide has been collected, the contactor chamber and the desiccant chamber are sealed from the incoming air flow. The desiccant chamber is evacuated, the collected water is sent to storage, and the desiccant in the desiccant chamber is dried. Meanwhile, a vacuum pump creates a partial vacuum in the contactor chamber and vents the air extracted from the collector chamber to the outside. The air vent to the outside is closed and the vacuum in the collection chamber causes the collected CO2 to be released from the molecular sieve and collect in a vacuum chamber. The CO2 solidifies on a cold finger in the vacuum chamber. The cold finger is cooled to about negative one hundred and nine degrees Fahrenheit using cryogenic coolant. The cryogenic coolant is circulated through the cold finger and then routed to the condenser described above. When substantially all of the CO2 has been extracted from the contactor chamber, the contactor chamber is sealed from the vacuum chamber and the vacuum chamber is heated. The solid CO2 transitions to a gas and is piped to a storage tank. As described above, apparatus 400 includes two channels, or paths, that operate in parallel alternating cycles. Thus, when one channel is sealed to extract the collected CO2, the other channel is opened to receive the air blown by fans and collect CO2.

The systems and methods described herein may be scaled up or down to meet desired CO2 capture. For example, decreasing the airflow of into the system, such as by using fewer or smaller fans, will decrease the amount of CO2 collected each day, but may result in a smaller size system. Similarly, increasing the number of air moving devices, using fans that provide a greater flow of air, etc. can increase the CO2 collected per day, with an increase in system size. Further, more than two collection assemblies may be used. For example, a system can include four collection assemblies cyclically operated in pairs (e.g., two collection assemblies collecting and two collection assemblies regenerating).

In some embodiments, the systems and methods described herein may be implemented at, or near, a location at which the collected CO2 will be used. For example, if the collected CO2 is to be used in EOR, the system may be implemented at the oil field at which the EOR will occur. Further, exemplary systems may be implemented located at or near an existing pipeline, thereby reducing transportation and/or pipeline costs.

Thus, exemplary embodiments may provide increased CO2 production over some known methods of CO2 collection. Further, the described embodiments may provide for CO2 collection in environments having atmospheric air with greater water content than the environments in which some known methods are capable of operating. Moreover, the described embodiments provide water as a byproduct of the collection of CO2 and remove more CO2 from the environment than is produced by the embodiments in the process of collecting the CO2. Accordingly, embodiments of the present disclosure may provide affordable, environmentally friendly collection of CO2 from atmospheric air.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of collecting carbon dioxide using a system including a first collection assembly and a second collection assembly, the first collection assembly including a first desiccant material and a first contactor chamber, the second collection assembly including a second desiccant material and a second contactor chamber, said method comprising:
   generating, with a plurality of air moving devices, a flow of atmospheric air into the system for collecting carbon dioxide;
   channeling the flow of atmospheric air through a filter assembly;
   removing water from the flow of atmospheric air with a condenser to produce intermediate air;
   directing the intermediate air to the first collection assembly;
   removing additional water from the intermediate air with the first desiccant material to produce first dry air;
   adsorbing carbon dioxide to a first material from the first dry air in the first contactor chamber;
   coupling a vacuum pump in flow communication with a vacuum chamber that is separate from the first contactor chamber;
   sealing the first contactor chamber and the second contactor chamber from the flow of atmospheric air and fluidly coupling the first contactor chamber with the second contactor chamber to equalize a first pressure of the first contactor chamber with a second pressure of the second contactor chamber, the sealing and the fluidly coupling of the first contactor chamber with the second contactor chamber occurring after the adsorbing carbon dioxide to the first material is complete;
   fluidly coupling the vacuum chamber with both the first contactor chamber and the second contactor chamber, the fluidly coupling of the vacuum chamber with both the first contactor chamber and the second contactor chamber occurring after the fluidly coupling of the first contactor chamber with the second contactor chamber is complete;
   releasing the adsorbed carbon dioxide from the first contactor chamber to the vacuum chamber by inducing a negative pressure in the vacuum chamber with the vacuum pump;
   decoupling the first contactor chamber from the second contactor chamber;

transitioning the carbon dioxide released from the first contactor chamber from a gas to a solid in the vacuum chamber;

regenerating the first desiccant material by sealing the first desiccant material from the condenser and the first contactor chamber and applying suction using the vacuum pump to draw water from the first desiccant material;

directing the intermediate air to the second collection assembly after releasing the adsorbed carbon dioxide from the first contactor chamber and after decoupling the first contactor chamber from the second contactor chamber;

removing additional water from the intermediate air with the second desiccant material to produce second dry air; and adsorbing carbon dioxide to a second material from the second dry air in the second contactor chamber, wherein the transitioning the carbon dioxide released from the first contactor chamber and regenerating the first desiccant material steps occur concurrently with the removing additional water with the second desiccant material and adsorbing carbon dioxide to the second material steps.

2. The method in accordance with claim 1, wherein the first collection assembly comprises a desiccant chamber containing the first desiccant material, and said removing additional water from the intermediate air comprises removing additional water from the intermediate air by directing the intermediate air through the first desiccant chamber.

3. The method in accordance with claim 1, wherein said adsorbing carbon dioxide to the first material comprises adsorbing carbon dioxide to a molecular sieve material in the first contactor chamber by directing the first dry air through the molecular sieve material.

4. The method in accordance with claim 1, wherein said transitioning the carbon dioxide released from the first contactor chamber comprises cooling a surface within the vacuum chamber to a temperature low enough to cause the carbon dioxide released from the first contactor chamber to solidify on the surface.

5. The method in accordance with claim 4, further comprising transitioning the carbon dioxide in the vacuum chamber from the solid to the gas for collection by substantially sealing the vacuum chamber, terminating cooling of the surface, and heating an interior of the vacuum chamber.

6. The method in accordance with claim 4, wherein said transitioning the carbon dioxide released from the first contactor chamber comprises cooling the surface within the vacuum chamber with a coolant.

7. The method in accordance with claim 6, further comprising directing the coolant from the vacuum chamber through the condenser.

8. The method in accordance with claim 1, further comprising:
collecting water removed from the flow of atmospheric air with the condenser and the first desiccant material; and
directing the collected water to storage.

9. The method in accordance with claim 5, wherein heating an interior of the vacuum chamber comprises heating the interior of the vacuum chamber with a resistive heater.

10. The method in accordance with claim 6, wherein the surface within the vacuum chamber comprises a surface of a cold finger disposed in the vacuum chamber and wherein cooling the surface within the vacuum chamber with the coolant comprises passing the coolant through the cold finger.

11. The method in accordance with claim 1, further comprising:
coupling the vacuum pump in flow communication with the vacuum chamber after adsorbing carbon dioxide to the second material in the second contactor chamber;
releasing the adsorbed carbon dioxide from the second contactor chamber to the vacuum chamber by inducing a negative pressure in the vacuum chamber with the vacuum pump;
transitioning the carbon dioxide released from the second contactor chamber from a gas to a solid in the vacuum chamber; and
regenerating the second desiccant material by sealing the second desiccant material from the condenser and the second contactor chamber and applying suction using the vacuum pump to draw water from the second desiccant material.

12. The method in accordance with claim 1, further comprising extracting the carbon dioxide gas from the vacuum chamber to one of an external storage facility and a pipeline through a compressor coupled in flow communication with the vacuum pump.

* * * * *